Patented July 4, 1933

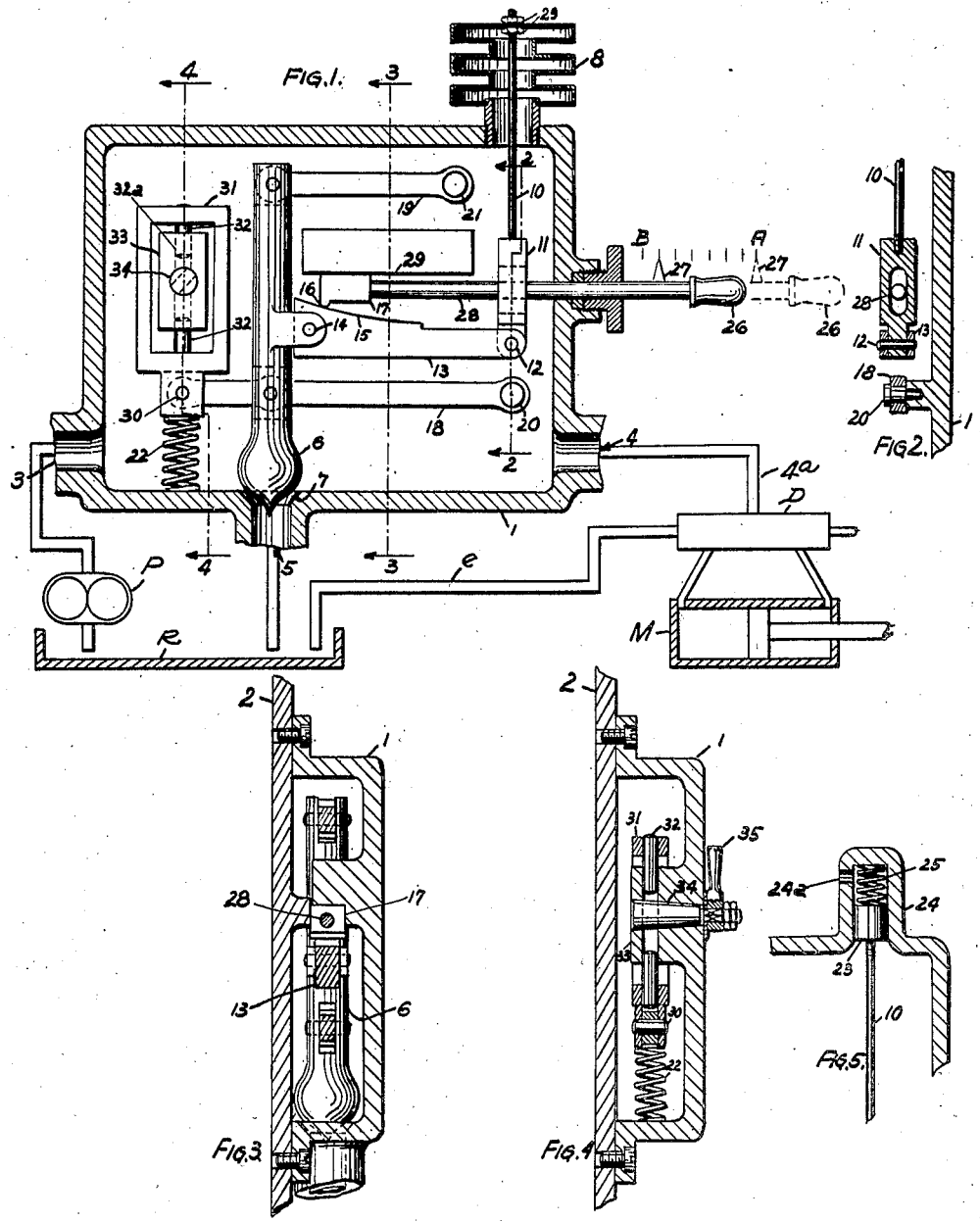

1,916,433

UNITED STATES PATENT OFFICE

WOLFGANG CARL MULLER, OF CINCINNATI, OHIO, ASSIGNOR TO THE CINCINNATI MILLING MACHINE COMPANY, OF CINCINNATI, OHIO, A CORPORATION OF OHIO

SPEED CONTROL VALVE

Application filed May 15, 1928. Serial No. 277,972.

My invention relates to speed control valves such as are used on hydraulic-operated machine tools and other machines driven by a fluid from a constant displacement pump.

Constant displacement pumps are often used on machine tools in place of the very expensive variable displacement pumps. The commonly used devices of this kind work in such a way that the liquid running from the pump passes through a valve which is shut down when the speed of the machine is to be reduced. The superfluous supply of liquid under pressure which is caused by closing the speed control valve is by-passed through a relief valve. This arrangement has the disadvantage that the oil pump always works against the pressure at which the relief valve is set. This pressure has to be higher than the highest pressure used to drive the machine. The object of my invention is to obtain an adjustable speed without having the liquid circulated at a higher pressure than is required to drive the machine.

Existing devices have also the disadvantage that the speed of the machine is reduced when the load on the machine increases. The reverse is also true. This is due to the fact that the volume of liquid which will pass through a given sized opening changes when the pressure differential changes. It is the object of my invention also to provide a balancing device which is designed so that any adjusted speed will be automatically kept constant under various loads on the machine.

Other novel and useful improvements will be more specifically pointed out in the ensuing specification.

In the drawing:—

Figure 1 is an organizational view of a typical system incorporating my valve device, the latter being shown in vertical section through the casing enclosing the operating parts thereof.

Figure 2 is a vertical section on the line 2—2 of Figure 1.

Figure 3 is a vertical section on the line 3—3 of Figure 1.

Figure 4 is a vertical section on the line 4—4 of Figure 1.

Figure 5 is a section showing an alternative combination for the relief chamber.

I have shown main casing 1 and plate 2 which together form a pressure tight chamber in which the operating parts of the valve are enclosed. The fluid enters through port 3 and passes to the machine through a port 4. The fluid is supplied through the port 3 from a constant displacement pump P. From the port 4 the fluid is directed through the pipe 4a to a directional valve D which directs the fluid to one end or the other of the cylinder of the motor M. A pipe line e conducts the exhaust from the valve D to the reservoir R. More fluid than is required is supplied by the pump, and the excess is by-passed and returned to a reservoir or pump through the port 5, where it can again be re-circulated and used to operate the machine. In the present illustration the excess, by-passed from casing 1, exhausts into the reservoir R. It will be understood that Fig. 1 is for the most part diagrammatic being intended to illustrate the manner in which the control valve may be incorporated in the rate control line of a system, in this case the supply line to the motor. The motor may be connected to operate the work or tool carrying table of a machine tool and be provided with conventional controls.

The plunger with its ball shaped plug 6, is disposed and supported so that it can restrict the seat opening 7 and thus control the amount of fluid flowing through the port 5. By raising or lowering the plunger by an external adjustment the amount of fluid by-passed may be varied and hence the speed of the machine can be varied. The variation in the quantity of fluid passing through the port 5 results in the variation of the speed of the driven machine because of the increase or decrease of fluid flowing through the port 4 to the machine.

This external adjustment makes it possible to change the speed of the machine and cause a uniform pressure in the fluid between the pump and the driven machine as there is no throttle valve between the pump and the machine through which the driving fluid passes. Therefore the pump never has to work against a higher pressure than is required to drive the machine. This reduces considerably the power that has been necessary to drive hydraulically-operated machines.

As above mentioned, in previous devices, a variation of the pressure in the fluid caused by variations in the load of the work will vary the volume of fluid by-passed, and hence the speed of the machine. In order to avoid this, I have provided a balancing device which keeps the speed of the machine uniform under increased loads by automatically closing the by-pass so that the same quantity of fluid will pass through the by-pass under the increased pressure. The device consists of an expansion chamber such as the collapsible bellows 8, which expands upwardly when the pressure increases.

A rod 10 is fastened to the top wall of the relief chamber 8 by means of two lock-nuts and its lower end screws into a slotted member 11 which is raised or lowered by the movement of the top of the case 8. A pivot 12 mounted in the lower end of the member 11, carries a cam member 13 which is also pivotally mounted on the ball pointed piston 6 by the stud 14. The members 10, 11, and 13 are the means for transmitting upward and downward movement from the case 8 to the piston 6.

An increase in pressure will cause a downward movement of the piston 6 which decreases the opening 7 for the by-passing fluid just enough to keep the quantity of passing fluid constant under the increased pressure. Therefore the valve 7 will allow a constant volume of fluid to pass, which will result in a constant speed of the machine under variable load conditions.

The curved surface 15 of the member 13 is in point contact with a portion 16 of a slidably mounted block 17. Movement of the point 16 along the surface 15 will fix the position of the piston 6 and therefore increase or decrease the opening of the port 7 depending upon whether it is moved to the right or left. In addition to varying the opening of the port it also acts as a variable fulcrum for the lever 13 because moving the point contact to the right or left between the pivots 14 and 12 will change the ratio of the lengths of lever arm on either side of the point 16.

The piston 6 is supported by the pivotally mounted levers 18 and 19 on the studs 20 and 21. This method of mounting tends to reduce the friction on the moving parts and gives a free acting four bar chain linkage. The lever 18 extends to the left beyond the piston 6 and is pivotally mounted on a pin 30 in a sliding block 31 to be described. A spring 22 bears against the bottom of the block 31 and tends to move it towards the top of the case. This spring supports the piston 6 and keeps the surface 15 on the member 13 in contact with the point 16.

The movements of the piston 6 caused by the expansion chamber 8 have to be different, (depending on whether the piston 6 is in widely opened position with low speed of the machine, or in a more closed position with a higher speed of the machine). When the piston is fairly widely opened, a certain change in pressure makes a greater movement of the piston necessary to keep the quantity of liquid passing through the by-pass constant. When the piston valve is in a more closed position the same change in pressure requires less movement of the piston to cause the same effect. In order to effect this, the valve is so designed that when the piston is opened or closed, by moving the handle 26 in a horizontal direction, the proportionate length of the arms of the lever 13 is changed, and the fulcrum 16 moves along the curve 15. If the fulcrum is in the position shown in the drawings, a given movement of the expansion chamber 8 will effect a small movement of the piston 6.

I have shown an alternative for the case 8 as shown in Figure 5. This consists of a cylinder 24 integral with the housing and in which is mounted a piston 23 which is leakproof against oil. Mounted between the piston and the cylinder wall is a spring 25 which acts on the piston and tends to push it down to a previous setting. In order to relieve air binding I vent the cylinder above the piston by means of an orifice 24a. This is the preferred form but an air cushion could be substituted for a spring 25. This alternative device will have the same action with an increase or decrease of pressure within the case and cause the movement of the rod 10 and its other connecting parts.

In order to change the speed of the machine it is necessary to vary the volume of liquid passing through the by-pass port. To do this I have provided a handle 26 which is slidably mounted in a horizontal direction and has mounted thereon an indicator 27 movable within the space indicated by A and B. The handle portion 28 passes through the block 11 and connects to the sliding block 17. This block 17 is held in place and slides along the surface 29 which acts as a stop for it when the lever 13 bears against the point 16. When the handle 26 is at the extreme right position the block member 17 will have moved with it and allowed the piston to rise and open the port 5 completely. This is the position where all the fluid will pass through the port 5 and hence is the stop position for the machine. For the highest speed the handle 26 is moved to the extreme left closing the port 5 entirely causing all of the oil to pass to the port 4 and hence produce the highest speed of the machine. Any points between the positions A and B are mere variations from the lowest to the highest speeds.

If the fulcrum is in the extreme right position, however, the same movement of the chamber 8 will effect a much larger movement of the piston 6. This feature therefore causes a constant working speed of the machine under changing load conditions.

There is a certain quantity of fluid required to fill the expansion chamber 8. Therefore, an increase in load will cause a retarding in the speed of the machine, until the valve 7 compensates for the increased pressure by by-passing a uniform quantity of fluid. Similarly, a decrease in load will accelerate the speed. The valve can be designed so that only a very small quantity of liquid needs to be by-passed, so that the retardation and acceleration of the speed is less than on mechanically driven machines. To avoid any sudden shocks, such as originate in intermitting, turning, or cutting work, which will effect a slight jar of the machine, which might be dangerous for the tool edges, I have provided a shock absorber, which prevents vibration of the by-pass valve, and any jerky movement of the machine is eliminated.

A block 31 is pivotally mounted on the extension of the lever 18 by means of the stud 30 and confined to movement in the vertical plane by means of the pins 32 fixed in the block 31 and slidably mounted in holes 32a in a fixed block 33 on the housing. In the center of the fixed block 33 I have rotatably mounted a valve stem 34 which admits oil into the holes 32a and forms a cushion for the pins 32. The oil in these holes retards the movement of the block 31 just enough to prevent any reaction on the valve disc 6 due to shock caused by sudden changes of the pressure within the case. The amount of oil admitted into the holes 32a by the valve 34 is controlled by handle 35 located without the case.

The curve 15 can be arranged so that an increase of pressure in the valve will decrease the speed of the machine a certain amount, a condition desirable for drill press speed. The valve can also be used to effect a back pressure on the oil that returns from the machine. This is useful on a reversing machine such as is used for certain milling jobs. In such a machine the valve is used in the following manner:— The oil returning from the machine enters the port 3 and leaves under a certain pressure through port 5 while the port 4 is closed. Should the working pressure tend to accelerate the machine the pressure within the valve will be increased. As described, the piston 6 will move down just enough to keep the quantity of oil leaving the valve constant, and this condition will tend to maintain a constant speed of the machine.

A combination of this foregoing back pressure valve and the valve described more fully in the specification operated by the same handle will produce an ideal control where constant speed on hydraulic driven machines is required.

Having thus described my invention, what I claim as new and desire to secure by Letters Patent, is:—

1. A hydraulic valve for controlling the speed of a hydraulic machine comprising a casing provided with an inlet port, an outlet port, and a by-pass port, with means for controlling the opening of said by-pass port inversely in proportion to the increase of pressure in said casing, whereby a constant flow of liquid through said by-pass port will be provided, said means comprising an expansion chamber with mechanical connections therefrom for controlling the opening of said by-pass port inversely in proportion to the pressure within said casing, and a hydraulic shock absorbing device within said casing for preventing vibratory changes in the opening in said by-pass port, said means provided with adjusting devices actuable exteriorally of said casing.

2. A hydraulic valve for controlling the speed of a hydraulic machine comprising a casing provided with an inlet port, an outlet port, and a by-pass port, with means for controlling the opening of said by-pass port inversely in proportion to the increase of pressure in said casing, whereby a constant flow of liquid through said by-pass port will be provided, said means comprising an expansion chamber with mechanical connections therefrom for controlling the opening of said by-pass port inversely in proportion to the pressure within said casing, and a hydraulic shock absorbing device within said casing for preventing vibratory changes in the opening in said by-pass port, said means provided with adjusting devices actuable exteriorally of said casing, said device effective on said mechanical connections.

3. A valve for controlling the pressure of compressed liquid comprising a casing provided with an inlet port, an outlet port, and a by-pass port, with means for controlling the opening of said by-pass port inversely in proportion to the pressure within said casing whereby a constant flow through said by-pass port will be provided, said means comprising a relief chamber with mechanical connections therefrom for controlling the opening of said by-pass port, and a handle extending exteriorally of said casing having mechanical connections within the casing for varying the degree of effect of said relief chamber on the opening in said by-pass port in order to keep different speeds constant under various loads of the machine, said connections comprising a floating lever arm having a cam surface and said handle having a sliding member for engaging said cam surface.

4. A valve for controlling the pressure of compressed liquid comprising a casing provided with an inlet port, an outlet port, and a by-pass port, with means for controlling the opening of said by-pass port inversely in proportion to the pressure within said casing whereby a constant flow through said by-pass port will be provided, said means comprising a relief chamber with mechanical connections therefrom for controlling the opening of said by-pass port, and a handle extending exteriorly of said casing having mechanical connections within the casing for varying the degree of effect of said relief chamber on the opening in said by-pass port in order to keep different speeds constant under various loads of the machine, said connections comprising a floating lever arm having a cam surface and said handle having a sliding member for engaging said cam surface, and means within said casing for insuring the engagement of said sliding member and said cam surface.

5. A valve for controlling the pressure of compressed liquid comprising a casing provided with an inlet port, an outlet port, and a by-pass port, with means for controlling the opening of said by-pass port inversely in proportion to the pressure within said casing whereby a constant flow through said by-pass port will be provided, said means comprising a relief chamber with mechanical connections therefrom for controlling the opening of said by-pass port, and a handle extending exteriorly of said casing for varying the degree of effect of said relief chamber on the opening in said by-pass port in order to keep different speeds constant under various loads of the machine, said connections comprising a floating lever arm having a cam surface and said handle having a sliding member for engaging said cam surface, and means within said casing for insuring the engagement of said sliding member and said cam surface, said means comprising a spring.

6. Means for supplying hydraulic fluid through a conduit to a hydraulic propulsion system at a constant rate irrespective of normal load variations combining a source of hydraulic fluid adapted to produce a flow of hydraulic fluid into said conduit at a constant rate, and a regulating valve means connected in said conduit comprising a valve member governing the discharge through a by-pass opening from said conduit, a movable device responsive to pressure variations in said conduit, and connections therefrom to said valve member to maintain the latter in a variable open position in inverse proportion to the pressure in said conduit to maintain a volumetrically constant discharge through said by-pass and thereby a constant net delivery through said conduit.

7. A valve means adapted to be connected in a hydraulic line of a hydraulic propulsion system to maintain a selectively adjustable but normally constant delivery of liquid irrespective of load variations comprising a valve member arranged to control a by-pass opening from said line; a movable device responsive to variations of pressure in said line; a connection from said device to said valve member for varying the by-pass opening in inverse proportion to said variations of pressure, said connection including a link, a fulcrum therefor, and means for shifting the position of said fulcrum to vary the position of said valve for any given position of said pressure responsive device.

8. An hydraulic system comprising a source of hydraulic fluid adapted to deliver hydraulic fluid under pressure at a normally constant rate; conduit means therefor; a diverting branch conduit; valve means in said conduit means operative to constantly pass a portion of said hydraulic fluid through said diverting branch; and means for varying the net fluid delivered through said conduit by adjustably varying the constant flow through said diverting branch.

9. An hydraulic system combining a source of hydraulic fluid adapted to deliver hydraulic fluid under pressure at a normally constant rate; and means for controlling the delivery of said hydraulic fluid for utilization in variable amounts comprising a main conduit means, a diverting branch conduit connected to said main conduit means; throttle control means for said diverting branch operative to maintain a flow of hydraulic fluid through said diverting branch at a constant rate and thereby a net constant delivery through said main conduit means irrespective of pressure variations, and means for adjusting said throttle control means to effect a constant rate of flow through said diverting branch of different values and thereby a selectable net constant delivery through said main conduit means.

10. An hydraulic propulsion system combining a source of hydraulic fluid adapted to deliver hydraulic fluid at a normally constant rate; and means for controlling the delivery of said hydraulic fluid for utilization in variable amounts comprising fluid conduit means; a by-pass and valve control means therefor in said conduit means; and means responsive to pressure in said conduit means for maintaining said by-pass valve means in variably open position in inverse proportion to the pressure in said conduit means whereby a volumetrically constant flow of hydraulic fluid is maintained through said by-pass and a net volumetrically constant flow is delivered through said conduit.

11. Means for supplying hydraulic fluid through a conduit to a hydraulic propulsion system at a constant rate irrespective of normal load variations combining a source of hydraulic fluid adapted to produce a flow of hydraulic fluid into said conduit at a constant rate, and a regulating valve means connected in said conduit comprising a valve member governing the discharge through a by-pass opening from said conduit, a movable device responsive to pressure variations in said conduit, connections therefrom to said valve member to maintain the latter in a variable open position in inverse proportion to the pressure in said conduit to maintain a volumetrically constant discharge through said by-pass and thereby a constant net delivery through said conduit, and means for adjusting the effect on said valve of given pressure variations acting on said movable device.

12. An hydraulic system comprising a source of hydraulic fluid adapted to deliver hydraulic fluid under pressure at a normally constant rate; conduit means therefor; a diverting branch conduit; valve means in said conduit means including means connected to said valve means responsive to pressure variations in said conduit means and effective thereon to vary the opening therethrough inversely to pressure variations in said conduit means, said valve means being thereby continuously operative to pass a portion of said hydraulic fluid through said diverting branch at a constant volumetric rate; and means for selectively adjusting the initial opening of said valve means and the effect of said pressure responsive means on said valve means to vary the net fluid delivered through said conduit by adjustably varying the constant flow through said diverting branch.

13. An hydraulic system combining a source of hydraulic fluid adapted to deliver hydraulic fluid under pressure at a normally constant rate; and means for controlling the delivery of said hydraulic fluid for utilization in variable amounts comprising a main conduit means; a diverting branch conduit connected to said main conduit means; throttle control means for said diverting branch, including means responsive to pressure variations in said main conduit effective on said throttle means to vary the by-pass opening therethrough inversely to pressure variations in said conduit, said throttle means being operative to maintain a flow of hydraulic fluid through said diverting branch at a constant rate and thereby a net constant delivery through said main conduit means irrespective of pressure variations, and means for adjusting the effect of said pressure responsive means on said throttle means to produce a constant rate of flow through said diverting branch of different values and thereby a selectable net constant delivery through said main conduit means.

WOLFGANG CARL MULLER.